C. V. BOYS & J. W. TIERNEY.
MEANS FOR PRODUCING RAPID RECIPROCATING MOTION.
APPLICATION FILED JUNE 15, 1909.

1,007,521.

Patented Oct. 31, 1911.

3 SHEETS—SHEET 1.

INVENTORS.
CHARLES VERNON BOYS.
JOHN WILBUR TIERNEY.

By Spear, Middleton, Donaldson & Spear,
ATTY'S.

ATTEST.
Bent. M. Stahl.
Edwd L. Tolson.

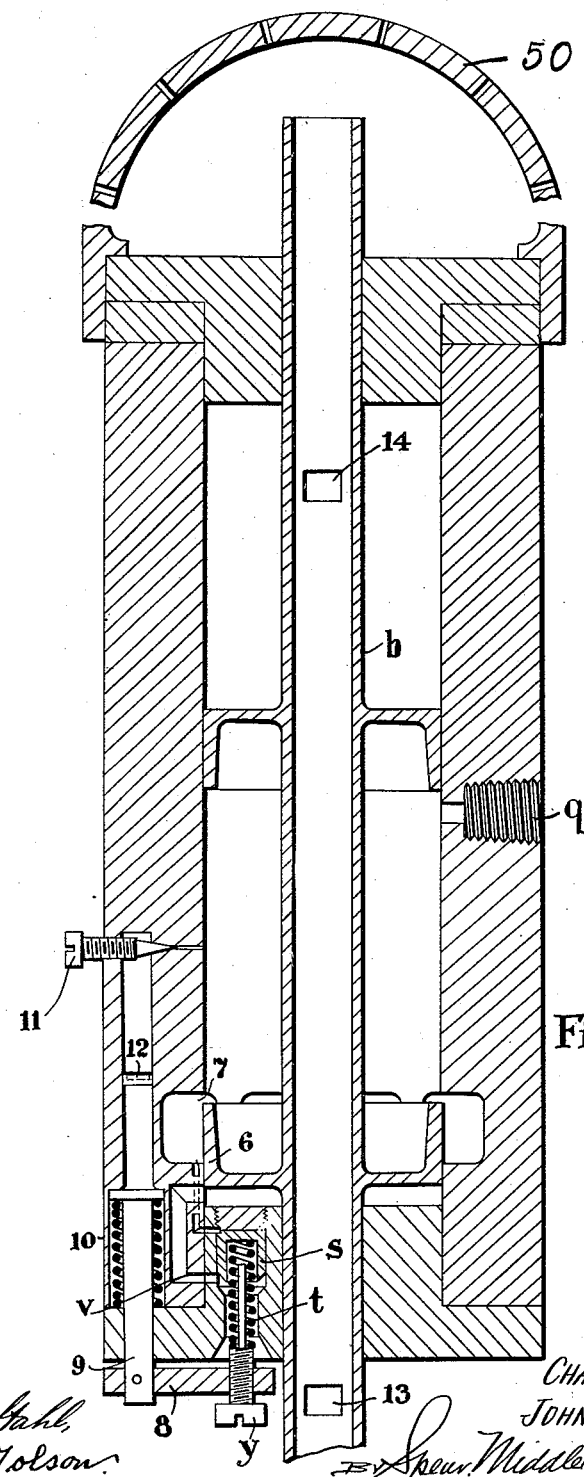

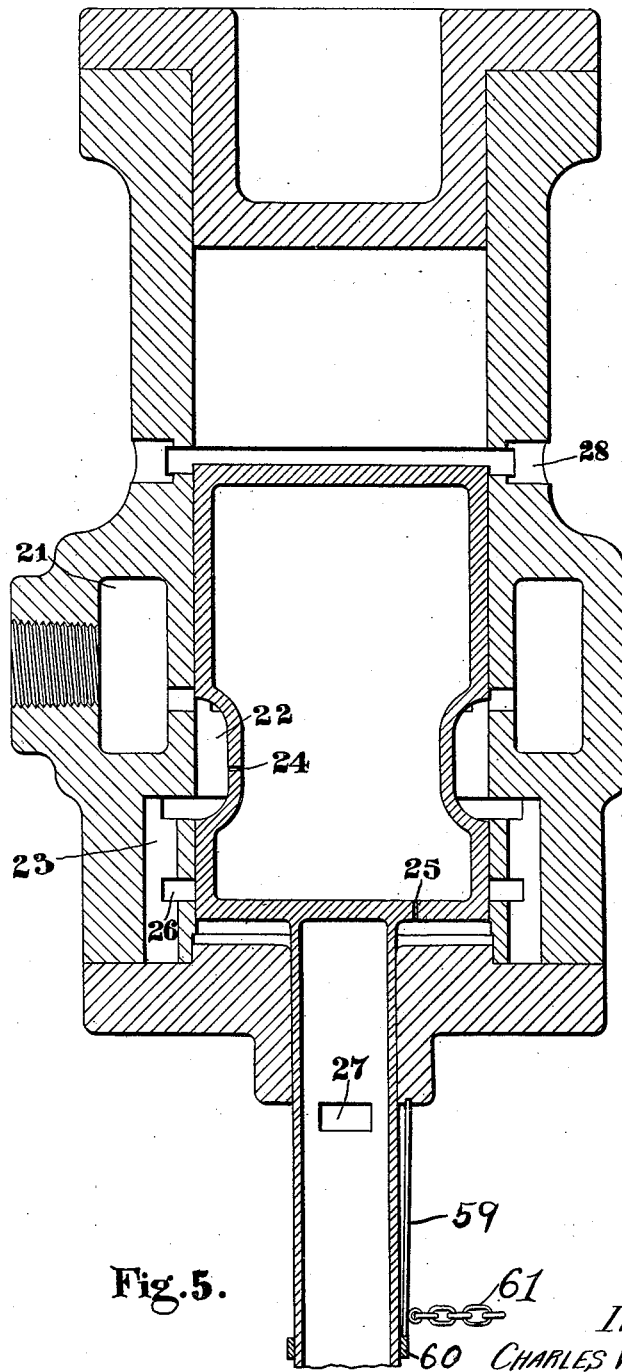

UNITED STATES PATENT OFFICE.

CHARLES VERNON BOYS AND JOHN WILBUR TIERNEY, OF LONDON, ENGLAND.

MEANS FOR PRODUCING RAPID RECIPROCATING MOTION.

1,007,521.  Specification of Letters Patent.  Patented Oct. 31, 1911.

Application filed June 15, 1909. Serial No. 502,376.

*To all whom it may concern:*

Be it known that we, CHARLES VERNON BOYS, F. R. S., a subject of the King of Great Britain and Ireland, and residing at 66 Victoria street, Westminster, London, S. W., England, and JOHN WILBUR TIERNEY, a citizen of the United States of America, and residing at "Ashtree," Beulah Hill, London, S. E., England, have invented a certain new and useful Improved Means for Producing Rapid Reciprocating Motion, of which the following is a specification.

Our invention relates to means for producing rapid reciprocating motion in cases in which an engine is only required to do very little external work.

The object of our invention is to construct an engine capable of rapidly producing rapid reciprocating motion, without producing excessive vibration.

The invention consists in producing the rapidly reciprocating motion in cases where little external work is required by the use of an elastic fluid spring, for example, an air buffer placed between two reciprocating elements one of which is elastically held, while the other, which is the working element, can reciprocate freely, the engine being so arranged that the common center of gravity of the two reciprocating elements is maintained practically at rest. The engine may be employed to produce the rapid reciprocating motion of a mold box to cause the loose powdered material in which a casting is to be formed to shake down into all the interstices of the pattern.

Figure 1:
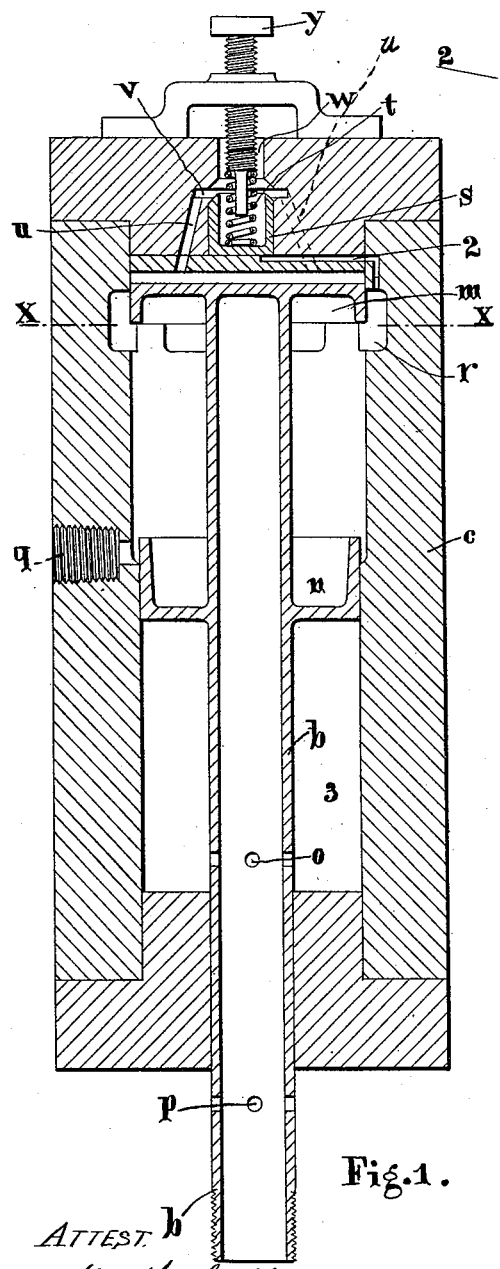
Figure 2:
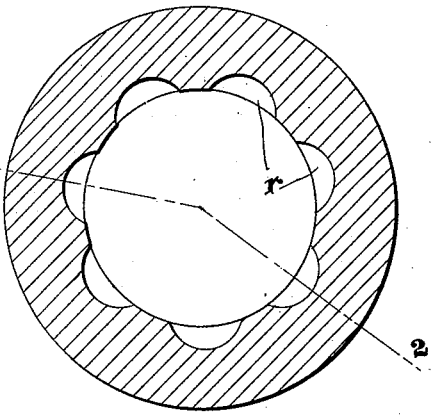
Figure 3:
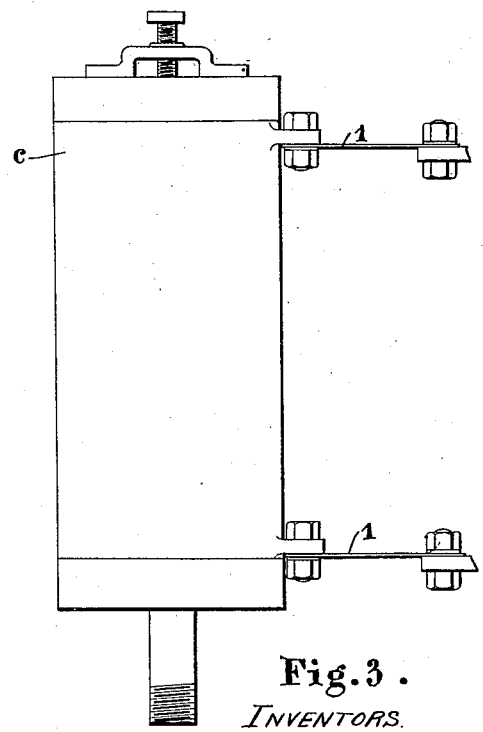

Referring to the accompanying diagrammatic drawings, Figure 1 is a sectional view showing two reciprocating elements according to our invention; Fig. 2 is a section on the line X—X Fig. 1; Fig. 3 shows an outside view of the engine; Fig. 4 is a section of modified forms of reciprocating elements; Fig. 5 shows a modification in which no lift valves are used.

In the form of apparatus utilizing an elastic fluid spring illustrated in Figs. 1, 2 and 3, the working element is a piston having surfaces, $m$, $n$, of different areas and mounted at the lower end of a hollow piston rod, $b$. The other reciprocating element is the cylinder, $c$, elastically held by springs 1. The space below the piston is entirely inclosed except when the piston is near its highest position, when it is put into communication with the atmosphere by means of the apertures, $o$, $p$, in the piston rod. Live air is admitted through the port, $q$, and passes into the space between the two ends of the piston and thence when the piston is in the correct position through the grooves, $r$, to the space above the piston. An aperture through one of the grooves, $r$, leads through the casing of the cylinder by the passage 2, to the under side of a valve, $s$, which is pressed by means of a spring, $t$. The exhaust from the space above the piston takes place through somewhat restricted apertures, $u$, $u$, leading into a groove $v$, which is open to atmosphere through the port, $w$. An adjusting screw, $y$, is provided for the purpose of adjusting the pressure in the spring, $t$. The flat springs 1, which support the cylinder, $c$, are fixed to any rigid means of support so that the cylinder is capable of a small vertically reciprocating motion but is rigid in any transverse direction.

The operation of the above described construction is as follows:—On admission of live air from the port, $q$, the space between the ends of the pistons becomes filled with live air, which, acting on the larger head, lifts the piston until it enters the grooves, $r$. The live air then passes through these grooves and through the small passage 2, to the underside of the valve, $s$, forcing this valve upward against its spring, $t$, and closing the exhaust passage, $w$, from the space above the piston. Some also passes to the space above the piston, where it is compressed. When the exhaust port $w$, is closed by the rising of the valve, $s$, the pressure in the space above the upper part, $m$, of the piston becomes equal to that in the space between the two parts of the piston and greater than that below the lower part, $n$, and so the whole piston is driven downward compressing air in the space 3. The exhaust valve, $s$, remains closed until the pressure in the space above the piston falls in consequence of expansion to such an extent that the spring, $t$, overcomes the air pressure on the lower side of the valve and when this is the case that valve opens and exhaust takes place. The compressed air or air spring in the space, 3, below the piston then arrests the downward motion of the latter and drives it upward again and the valve, $s$, will again close at a definite point of the upward movement of the piston depending on its velocity and on the capacity of the passages, u, and the consequent pressure arising in the grooves r, and passage, 2. After the first few strokes when the full velocity is attained the live air spring above the piston compressed above the live air pressure becomes the effective means for arresting the upward and starting the downward motion. The period of the stroke at which the exhaust valve opens and closes may be regulated by means of the screw, y, which may be turned to put more or less pressure on the valve spring, t. The passages, o and p, are provided to allow air to exhaust from or enter the space below the piston near the end of the up stroke and so prevent creeping of the piston in the cylinder and ultimate stoppage of its motion.

It will be seen that in the above arrangement as the cylinder, c, is free to reciprocate except as restrained by the springs 1, the center of gravity of the whole engine including the cylinder and piston together will remain practically at rest and very little vibration will be caused by the movement of the working element.

In the modification of the invention shown in Fig. 4, the piston is formed with equal faces above and below and live air is admitted to the interior of the piston as before. The flange, 6, on the lower end of the piston is shown longer than the groove, 7, so that no live air is ever admitted directly to the space below the piston. In this case the piston normally rests in its lower position by reason of its own weight. The arrangements at the upper end of the piston are similar to those above described for the corresponding end. A silencer, 50, as shown at the top of Fig. 4 is preferably provided. The adjusting screw, y, of the valve in this case is carried by an arm, 8, mounted on a plunger, 9, pressed in the upward direction by means of a spring, 10, while this plunger is pressed downward by live air entering through the needle valve, 11, and pressing on the cup-faced piston, 12. The effect of this is that immediately live air is admitted to the space between the ends of the piston the plunger, 9, begins to move downward slowly carrying with it the adjusting screw, y, and lessening the pressure in the spring, t. The valve, s, is similar to that above described with reference to Fig. 1 and is forced downward in order to cover the exhaust ports, v, by air of increasing pressure admitted through the passage, 2. Ports are provided in the piston rod, one at 13, which acts as the exhaust from below the piston when the machine is running at speed, while the other port, 14, operates as in the previously described modification for the purpose of preventing creeping.

The operation of this form of the invention is as follows:—On admission of live air through the port, q, the piston being in its lowest position owing to its own weight, live air passes into the cylinder and through the passage, 2, and closes the valve, s. Also a leak takes place around the edges of the groove, 7, to the space below the piston. Thus the pressure in the space below the lower part of the piston gradually becomes equal to that between the two parts thereof (the admission pressure) and greater than that above the upper part of the piston consequently this leak starts the upward movement of the piston which is slow until the groove, 7, is open to the space below the piston. The air in this groove then forces the piston upward compressing the air above it. When the pressure below the piston falls to a predetermined quantity the valve, s, opens under the action of the spring and exhaust takes place from below the piston which then returns, the valve, s, again closing at a certain point of the return stroke, in consequence of the increasing pressure below the piston. During the first few strokes of the piston the compressed air passing through the needle valve, 11, and acting on the piston, 12, of the plunger, 9, forces this plunger slowly downward against the action of the spring, 10, carrying with it the arm, 8, and screw, y. The pressure in the spring, t, thus gradually decreases until it is insufficient to open the exhaust valve, s; by this time the full reciprocating movement of the piston has been attained and the exhaust then takes place through the port, 13, in the hollow piston rod, b. It will be seen that in this modification the exhaust valve, s, is only in operation at starting. During steady running it remains closed and so does not wear, and further, the air is then used more efficiently the amount required being less. The groove, 7, may if desired be made wider than the piston head, 6, as in the arrangement shown in Fig. 1.

According to the modified form of reciprocating elements shown in Fig. 5, lift valves are entirely dispensed with. Live air is admitted through the passage, 21, and passes through grooves, 22, in the piston to pockets, 23, in the cylinder. When the compressed air is admitted a leak takes place through small apertures, 24, 25, to the space below the piston which normally remains in the lowest position by reason of its own weight. The piston is thus slowly moved upward through a short distance until the groove, 26, opens into the space below the piston which is then forced upward the pressure falling by expansion until the port, 27, in the hollow piston rod becomes opened. The compressed air in the space above the piston then arrests and drives the latter downward, ports, 28, being provided opening to atmosphere when the piston is nearly at the bottom of its down stroke. The starting of this form may be facilitated by the introduction of a catch, 59, which engages with a stop, 60, upon the hollow piston rod. When it is desired to start the apparatus this catch is allowed to engage the stop by releasing the chain, 61, by which it is normally held clear and so holds the piston down until the pressure below the piston is equal to that of the live air or nearly so. The sudden liberation of the catch by pulling the chain 61, will then allow the piston to start upward with a high velocity.

In the above described arrangements, if an increase is made in the pressure of the live air more work is done and the effect is slightly to increase the amplitude of movement, also the number of strokes in a minute. If the pressure of the live air is increased the forces in the cylinder may then be increased in proportion to the increased pressure and so a smaller piston and cylinder may be used.

It will be noticed in all these cases that the trapped air below as well as above the piston by its compression is most effective in returning the piston quickly and this is one of the advantages of this method of effecting the reciprocation for extreme rapidity is in some cases required and for the same stroke and number of strokes in a minute, the reversal is more rapid under the action of the air spring than it would be if eccentric driving were employed. Or in scientific language the acceleration toward the end of any stroke as compared with that at other parts of the stroke is greater than that pertaining to harmonic motion. This acceleration is greater at the lower end of the stroke in Fig. 4 than at the upper end and the converse is true in Fig. 1. For this reason we prefer to put the valve at the lower end as shown in Fig. 4. It will also be noticed that the amount of live air taken in at any stroke is a small proportion of that which would fill the cylinder, being only so much as is needed to maintain the pressure during expansion slightly above the pressure during the compression at corresponding parts of the stroke. Suitable means may be provided where required for preventing the piston from turning in the cylinder.

Having now described our invention what we claim as new and desire to secure by Letters Patent is:—

1. Apparatus for producing rapid reciprocating motion, comprising in combination, two movable elements, spring means holding one of said elements, said elements having between them an elastic fluid spring as and for the purposes described.

2. Apparatus for producing rapid reciprocating motion, comprising in combination, two movable elements, spring means holding one of said elements, said elements having between them an elastic fluid spring, and means supplying elastic fluid under pressure between said elements, as and for the purposes described.

3. Apparatus for producing rapid reciprocating motion, comprising in combination, two movable elements, means holding one of said elements yieldingly in the direction of reciprocation and rigidly in the direction transverse to the direction of reciprocation, said elements having between them an elastic fluid spring, and means supplying elastic fluid under pressure between said elements, as and for the purposes described.

4. Apparatus for producing rapid reciprocating motion, comprising in combination, two movable elements, spring means holding one of said elements, said elements having between them an elastic fluid spring, and means controlled by the relative movement of said elements intermittently supplying elastic fluid under pressure between said elements, as and for the purposes described.

5. Apparatus for producing rapidly reciprocating motion, comprising in combination, a cylinder closed at both ends, spring means holding said cylinder, a piston in said cylinder, said piston being arranged to compress elastic fluid at the two ends of said cylinder alternately, and means for supplying elastic fluid between said cylinder and said piston said means being controlled by the relative movement of said cylinder and said piston, as and for the purposes described.

In testimony whereof we affix our signatures in presence of two witnesses.

CHARLES VERNON BOYS.
JOHN WILBUR TIERNEY.

Witnesses:
P. M. DAVIES,
P. A. OUTHWAITE.

---

Copies of this patent may be obtained for five cents each, by addressing the "Commissioner of Patents, Washington, D. C."